US008669456B2

(12) United States Patent  
Clarke et al.

(10) Patent No.: US 8,669,456 B2  
(45) Date of Patent: Mar. 11, 2014

(54) VIDEO EXPORT OF A DIGITAL MUSICAL SCORE

(75) Inventors: Thomas E. Clarke, London (GB); Andrew C. Dodman, London (GB)

(73) Assignee: Avid Technology, Inc., Burlington, MA (US)

( * ) Notice: Subject to any disclaimer, the term of this patent is extended or adjusted under 35 U.S.C. 154(b) by 154 days.

(21) Appl. No.: 13/456,543

(22) Filed: Apr. 26, 2012

(65) Prior Publication Data

US 2013/0283999 A1   Oct. 31, 2013

(51) Int. Cl.
*G09B 15/00* (2006.01)
(52) U.S. Cl.
USPC ........................................................ 84/477 R
(58) Field of Classification Search
USPC ........................................................ 84/477 R
See application file for complete search history.

(56) References Cited

U.S. PATENT DOCUMENTS

| 7,119,266 | B1* | 10/2006 | Bittner et al. ............... 84/477 R |
| 7,790,975 | B2* | 9/2010 | Eastwood et al. ............. 84/611 |
| 8,035,020 | B2* | 10/2011 | Taub et al. .................... 84/600 |
| 2009/0228578 | A1* | 9/2009 | Demers et al. ............... 709/223 |

* cited by examiner

*Primary Examiner* — Jianchun Qin
(74) *Attorney, Agent, or Firm* — Oliver Strimpel

(57) ABSTRACT

Methods, systems, and computer program products for generating an animated playback of a musical composition represented as a digital musical score. The methods involve, for each of a series of landmarks in the digital musical score: determining a temporal location of audio playback of the landmark in an audio playback of the composition; generating a video output frame showing a page of the musical score spanning the landmark in an output page format; generating a segment of the animated playback of the composition having a video component showing the video output frame for a duration approximately equal to the difference between temporal locations of audio playback of successive landmarks and an audio component including an audio rendering of a portion of the score between the successive landmarks; and generating the animated playback of the musical composition by concatenating the segments. The score format is optimized for the video aspect ratio.

20 Claims, 8 Drawing Sheets

VIDEO EXPORT OF A DIGITAL MUSICAL SCORE

BACKGROUND

Users of digital music notation software generally output their work by printing a score onto paper, producing a standard hard copy formatted to fit the size of the paper being used. Paper is a convenient way to archive a composition and is also easy to copy. Another output option is to export a digital file of the score. In addition to the obvious ease of sharing, storing, and copying, a digitally represented score may also be used to drive digital displays that serve as the digital sheet music for performers. For example, performers may receive the digital file on a tablet computer which can be supported on a music stand. By providing an input control, a performer may turn the pages as needed.

With the proliferation of media sharing web sites and social networking platforms that facilitate the sharing of all kinds of media, there is a need for musical scores to be shared in ways other than via print and digital score file sharing.

SUMMARY

In general, the methods, systems, and computer program products described herein enable a digital musical score to be exported as a digital video file showing the score being played back in synchrony with an audio rendering of the score.

In general, in one aspect, a method of generating a video playback of a digital musical score comprises performing the following steps for each of a series of landmark elements in the digital musical score: determining a temporal location of audio playback of that landmark element in an audio playback of the digital musical score; generating a video output frame showing a page of the digital musical score rendered in an output page format, wherein the page spans a portion of the digital musical score that includes that landmark element; generating a segment of the video playback of the digital musical score, the segment comprising: a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and an audio component including an audio rendering of a portion of the digital musical score beginning with an audible musical event associated with the first landmark element, and ending with a last musical element prior to an audible musical event associated with the second landmark element. When the segments have been generated, or while the segments are being generated, generating the video playback of the digital musical score by concatenating the segments.

Various embodiments include one or more of the following features. The output page format is based in part on an aspect ratio of the video output frame. A number of staves on a page in output page format is based in part on an aspect ratio of the video frame. The digital musical score includes a plurality of staves, and receiving input specifying a subset of the plurality of staves to be included in the video playback of the digital musical score. Receiving first input data specifying whether the output page format is to correspond to a printed page output format of the digital musical score or whether the output page format is to be adapted to a dimensional characteristic of the video output frame; receiving second input data specifying a subset of the plurality of staves to be included in the video playback of the digital musical score; and determining the output page format based at least in part on the first input data and the second input data. Determining the output page format includes determining at least one of the set consisting of a vertical spacing of staves, a vertical positioning of staves, a vertical spacing of systems of music, a vertical positioning of systems of music, and a number of systems of music per page. The landmark elements include at least one of page breaks, repeat structures, and beat divisions. Receiving data specifying whether a playback line is to be included in the video playback of the digital musical score, and, if the received data specifies that a playback line is to be included in the video playback of the digital musical score, designating beat divisions in the digital musical score as landmark elements and including a rendering of a playback line in the video output frame at a location in the page of the musical score corresponding to beat division immediately prior to a musical element of the digital musical score currently being played back.

In general, in a second aspect, a computer program product comprises a computer-readable medium with computer program instructions encoded thereon, wherein the computer program instructions, when processed by a computer, instruct the computer to perform a method of generating a video playback of a digital musical score, the method comprising: for each of a series of landmark elements in the digital musical score: determining a temporal location of audio playback of that landmark element in an audio playback of the digital musical score; generating a video output frame showing a page of the digital musical score rendered in an output page format, wherein the page spans a portion of the digital musical score that includes that landmark element; generating a segment of the video playback of the digital musical score, the segment comprising: a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and an audio component including an audio rendering of a portion of the digital musical score beginning with an audible musical event associated with the first landmark element, and ending with a last musical element prior to an audible musical event associated with the second landmark element; and the video playback of the digital musical score by concatenating the segments.

Various embodiments include computer program products capable of performing one or more of the features described above.

In general, in a third aspect, a computer system for generating a video playback of a digital musical score comprises a processor programmed to: for each of a series of landmark elements in the digital musical score: determine temporal location of audio playback of that landmark element in an audio playback of the digital musical score; generate a video output frame showing a page of the digital musical score rendered in an output page format, wherein the page spans a portion of the digital musical score that includes that landmark element; generate a segment of the video playback of the digital musical score, the segment comprising: a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and an audio component including an audio rendering of a portion of the digital musical score beginning with an audible musical event associated with the first landmark element, and ending with a last musical element prior to an audible musical event associated with the second landmark element; and generate the video playback of the digital musical score by concatenating the segments.

Various embodiments include computer systems comprising a processor programmed to perform one or more of the features described above.

BRIEF DESCRIPTION OF THE DRAWINGS

FIG. 3 is a screen shot showing a preview of a video frame for video export of the score.

FIG. 5 is an illustration of a video frame for a segment of a video export of a score without a playback line.

DETAILED DESCRIPTION

With the popularity and ubiquity of video sharing web sites, composers using music notation software applications, such as SIBELIUS® from Avid Technology, Inc., often wish to share a score they have created as a video. In order to achieve this, they currently resort to making crude screen captures of their notation software as it plays back a score they have created. This procedure is cumbersome and time-consuming, and usually produces uneven, amateurish results with the score being in a format more suitable for printing on paper than for video, and with distractions of the notation software user interface.

The methods and systems described herein enable a composer to generate and export an animated musical score suitable for uploading and publishing to media sharing or social networking sites. The video is rendered by a software notation engine that is typically already a part of a musical notation software application, and the software's audio payback is synced up in a video file, ready to be uploaded, compressed, or shared.

Figure 1:
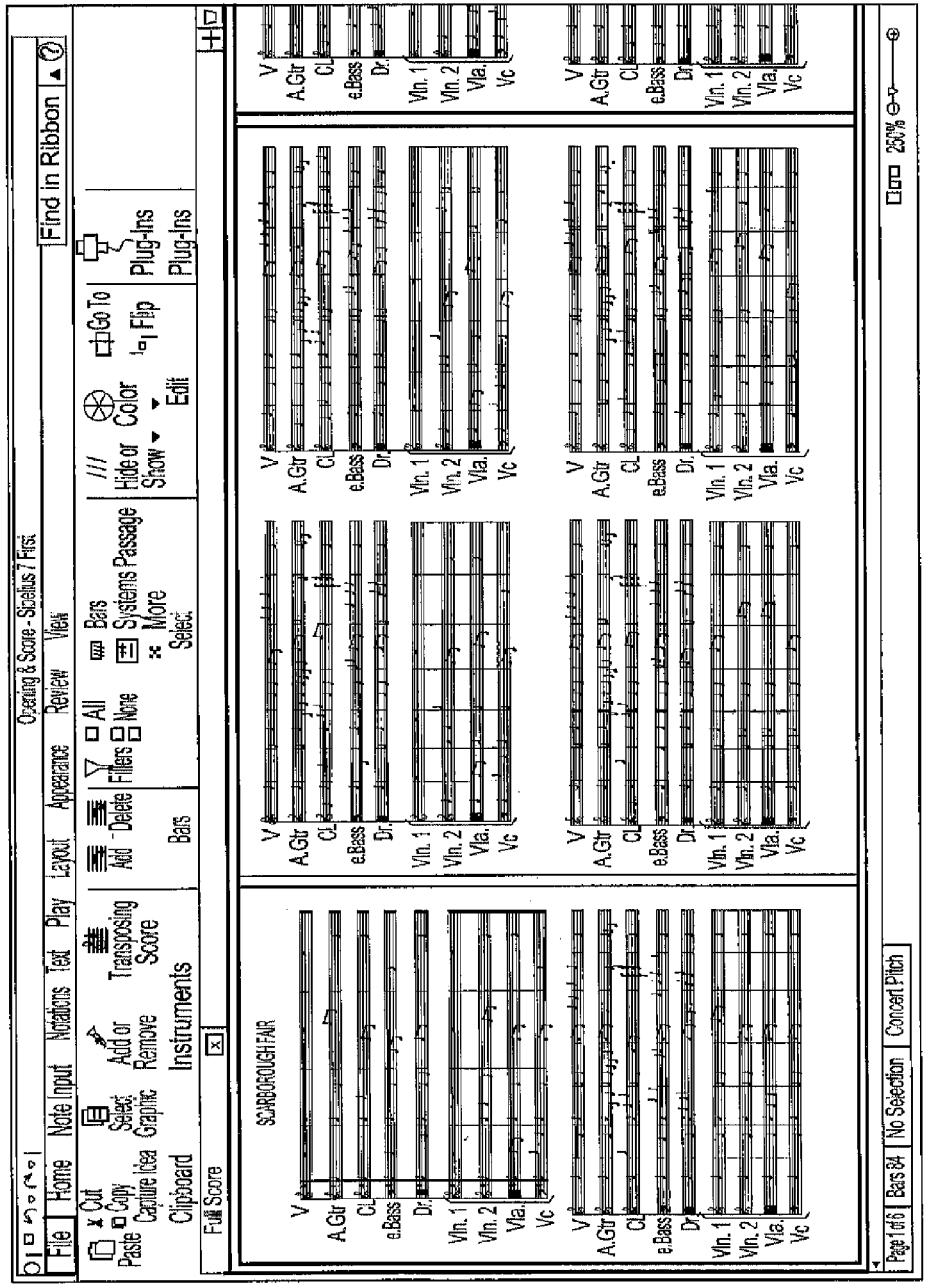
FIG. 1 is a screen shot of a standard page view of a score as displayed by a music notation application.

A graphical user interface enables a user of a musical notation software application to invoke video export functionality and to select appropriate output parameters. FIG. 1 illustrates a screen shot of a standard page view of a score formatted in a standard output format such as 8.5×11 inches. The video export feature may be invoked by selecting a menu item, which brings up one or more pages for selecting parameters for the animated video.

Figure 2:
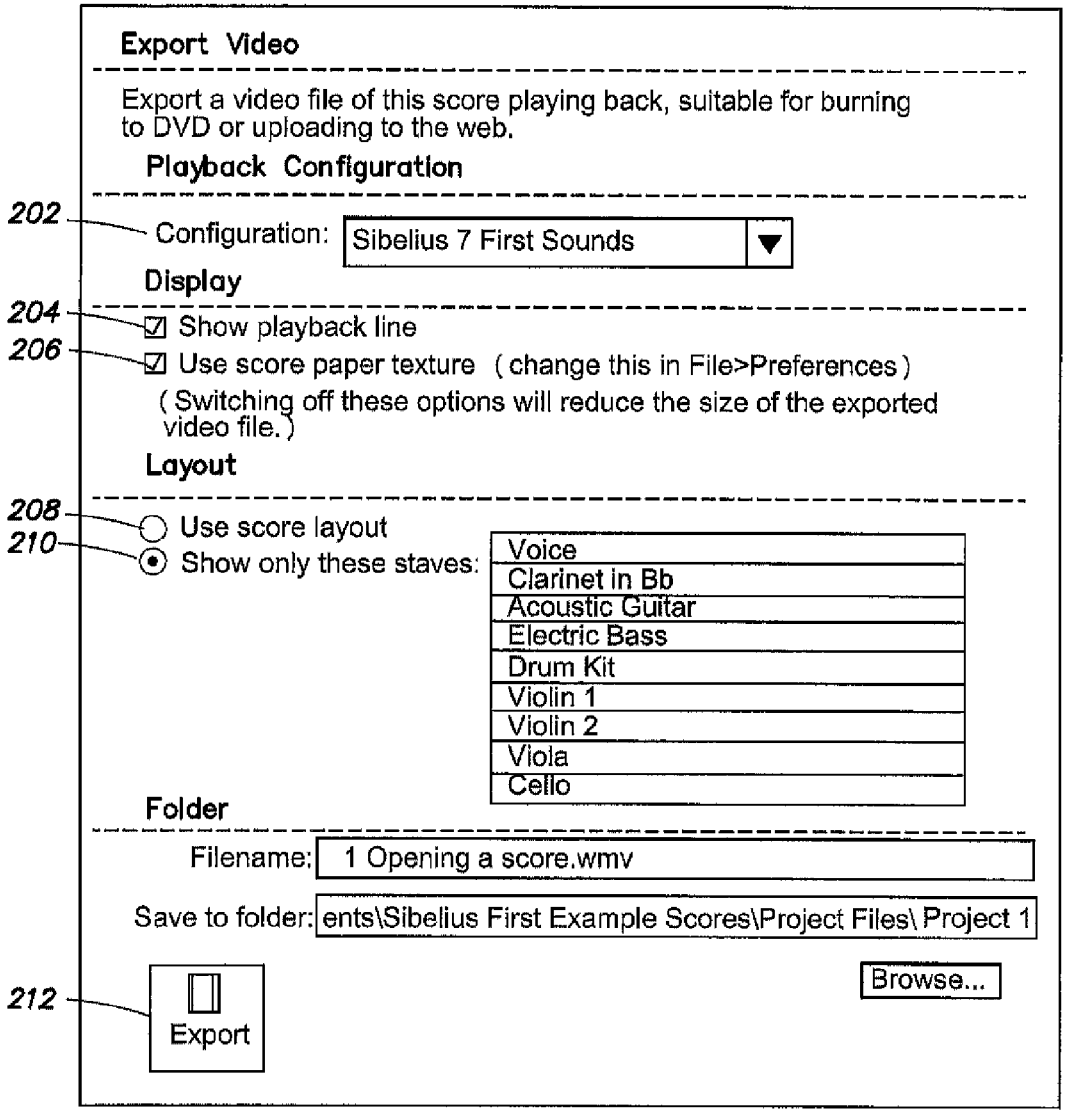
FIG. 2 is a screen shot of a user interface for determining video export parameters for a score.

FIG. 2 illustrates a user interface for selecting playback, display, and layout parameters for an animated playback video file to be exported. Playback configuration menu 202 enables a user to select a sound library to be used to create the audio instruments for the audio track of the video. A sound library, or sample library, is a collection of recorded musical sounds organized into a common digital file format, and is often provided together with a musical notation software application. Among the display choices that may be selected by the user is whether or not to show the playback line or not (204). The playback line appears at an approximate location of each of the beats in the measures, moving in synch with the audio playback. Additional display parameters may include whether to render the output with the texture of paper (206).

Among the layout parameters, a key choice is whether or not to generate the video using the same score layout that would be used for a normal page view on a computer screen, i.e., in the format suitable for printing on paper (208). If print format is selected, the proportions of the measures, systems and staves, and thus the relative positions of objects to one another, remain exactly as would have been displayed on a printed page. The finished score is displayed in score page format that is scaled (without changing the aspect ratio) to fit the dimensions of the video output, and shaded areas are added to extend the page boundaries to the edges of the video aspect ratio being used. On the other hand, if print format is not selected, the system is able to adapt the score page output format for the video to optimize it for the video format, which involves complete reformatting of the score, such as by including or omitting any number of staves, recalculating page dimensions, and other measurements, and laying out the score based on such parameters. Various optimizations are described in more detail below.

Figure 3:
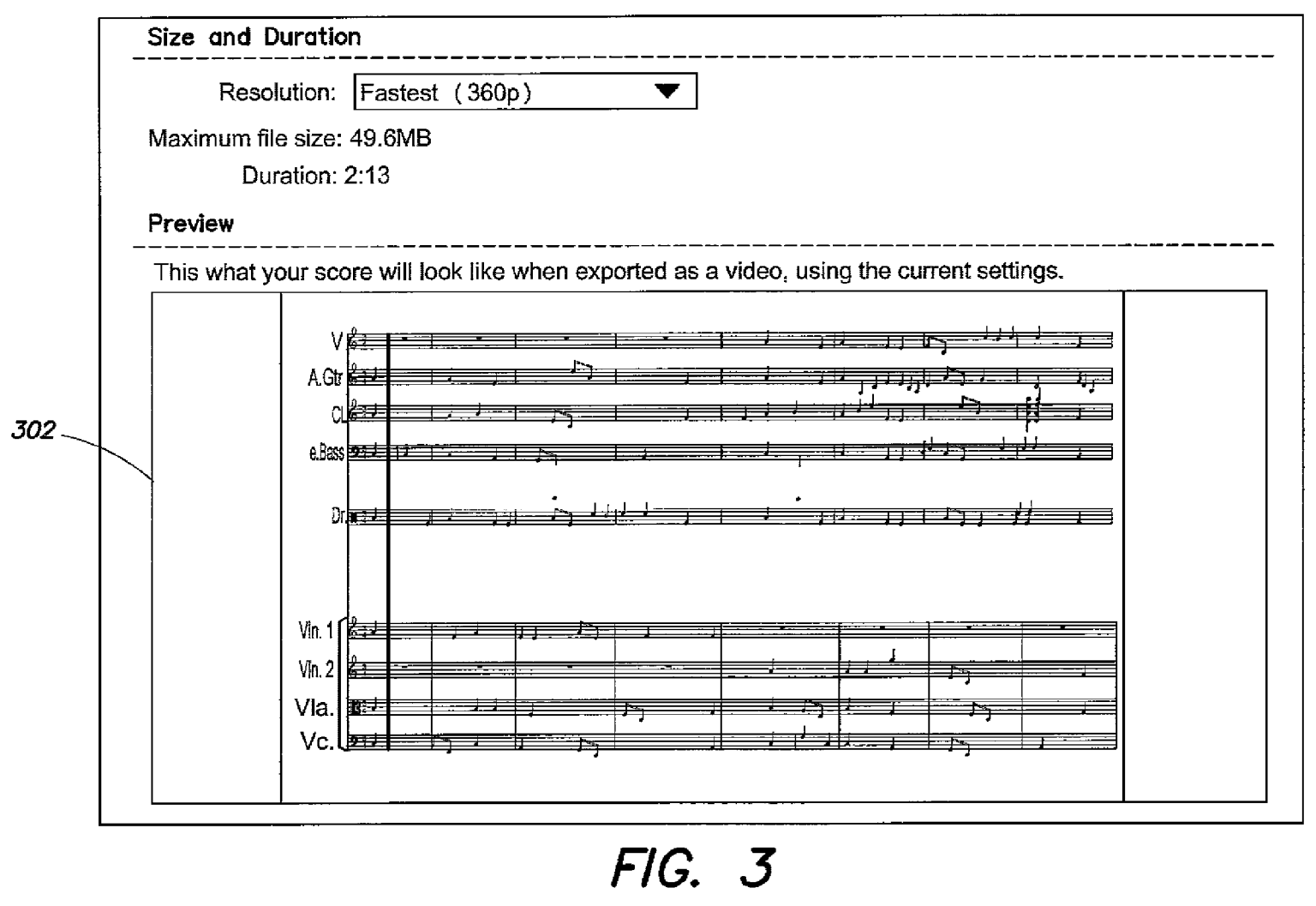

The user may also determine whether all the staves that form a part of the digital music score should be included in the video output, or whether only a subset should be included (210). Given that a video frame usually has a lower resolution than a printed page, the user may wish to reduce the amount of material to be shown on the video by omitting some of the staves, with the result that the output video only shows music for a subset of the featured instruments. Even if only a subset of staves is selected for the video output, the audio playback is for all the staves in the score, unless the user chooses to mute specific instruments using a mixer control. Once the parameters have been selected, the user may initiate the generation and export of the animated video playback, for example by pressing a button labeled "export." (212) A preview pane (FIG. 3, 302) displays the consequences of changes in settings.

Various steps involved in the creation of the animated playback include preparing the score for video export, calculating correspondences between audible musical events and required display changes, and rendering the output video and audio.

To prepare and optimize the layout of a musical score in order to make the best use of the video dimensions, the application works with a copy of the reference digital score in order to avoid risking altering it. If the user has not selected the normal print output format, the system generates a new score layout afresh, based on the video screen aspect ratio and the number of staves chosen for the video. The application determines the resolution at which the user wishes to export their video and assumes a standard aspect ratio based on the resolution choice. For example, if 360p (480×360) or 480p (640×480) is selected, the application uses a 4:3 aspect ratio, and if 720p (1280×720) or 1080p (1920×1080) is selected, the application uses a 16:9 aspect ratio. No matter what the orientation and aspect ratio of the original score is, the application is able to optimize the video output format to the aspect ratio of the chosen video output resolution.

Once the parameters of the video have been determined, the application performs one or more of the following layout and formatting actions. It sets the minimum vertical justification of staves to a fixed value designed to distribute the staves across the full height of the page. Page numbering is switched off. Special formatting items, such as those previously entered by the user are removed, and the staff margins and page margins are set to use the lateral dimensions of the page. If the total number of staves selected is above a predetermined number, a stave height is calculated which will allow a single system of music to fill the page. If the total number of staves selected is fewer than the predetermined number, a stave height that will allow multiple systems of music to fit on the page is calculated. Preferred values of the predetermined number include three, four, or five.

The application then calculates the playback positions corresponding to the score landmark elements. A landmark element is an element that determines a point during the playback when the display needs to change to reflect playback of the corresponding musical event. Examples of landmark elements include page breaks, repeat structures, and beat divisions. Beat divisions are included when the user wishes to display a playback line moving through the musical score.

Figure 4:
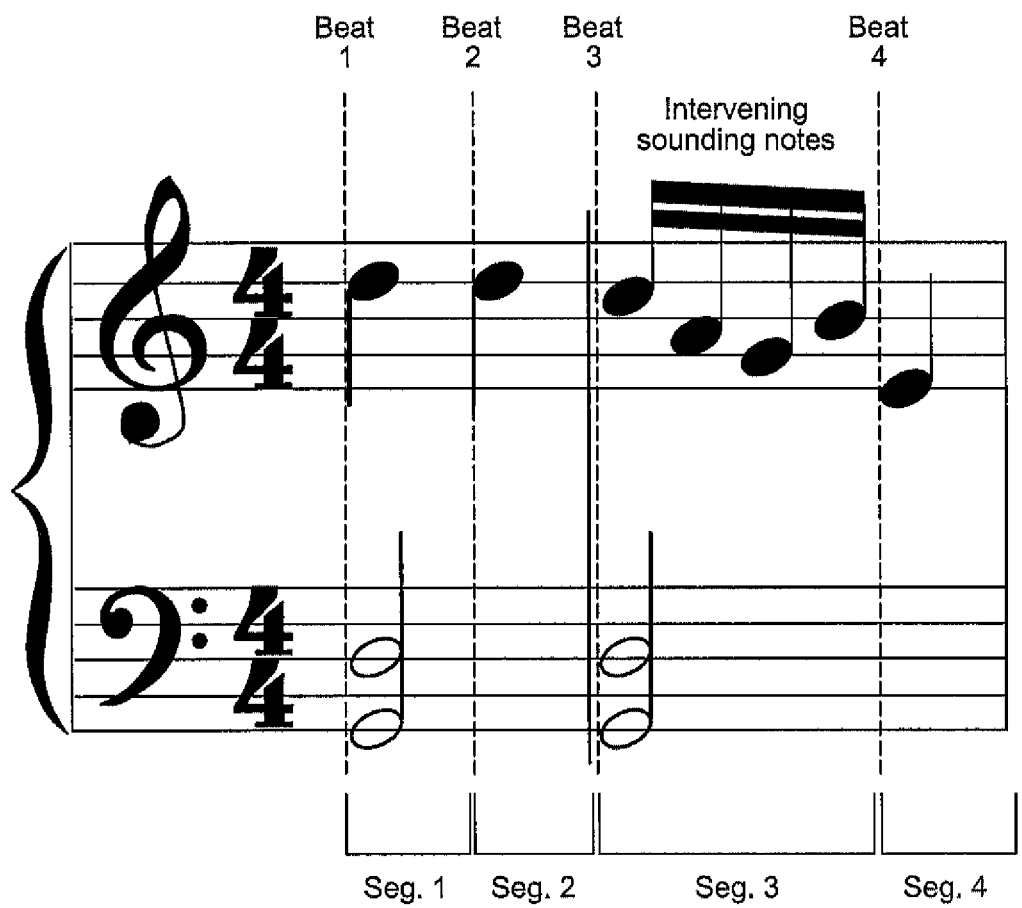
FIG. 4 is an illustration of a video frame for a segment of a video export of a score containing a playback line.
Figure 5:
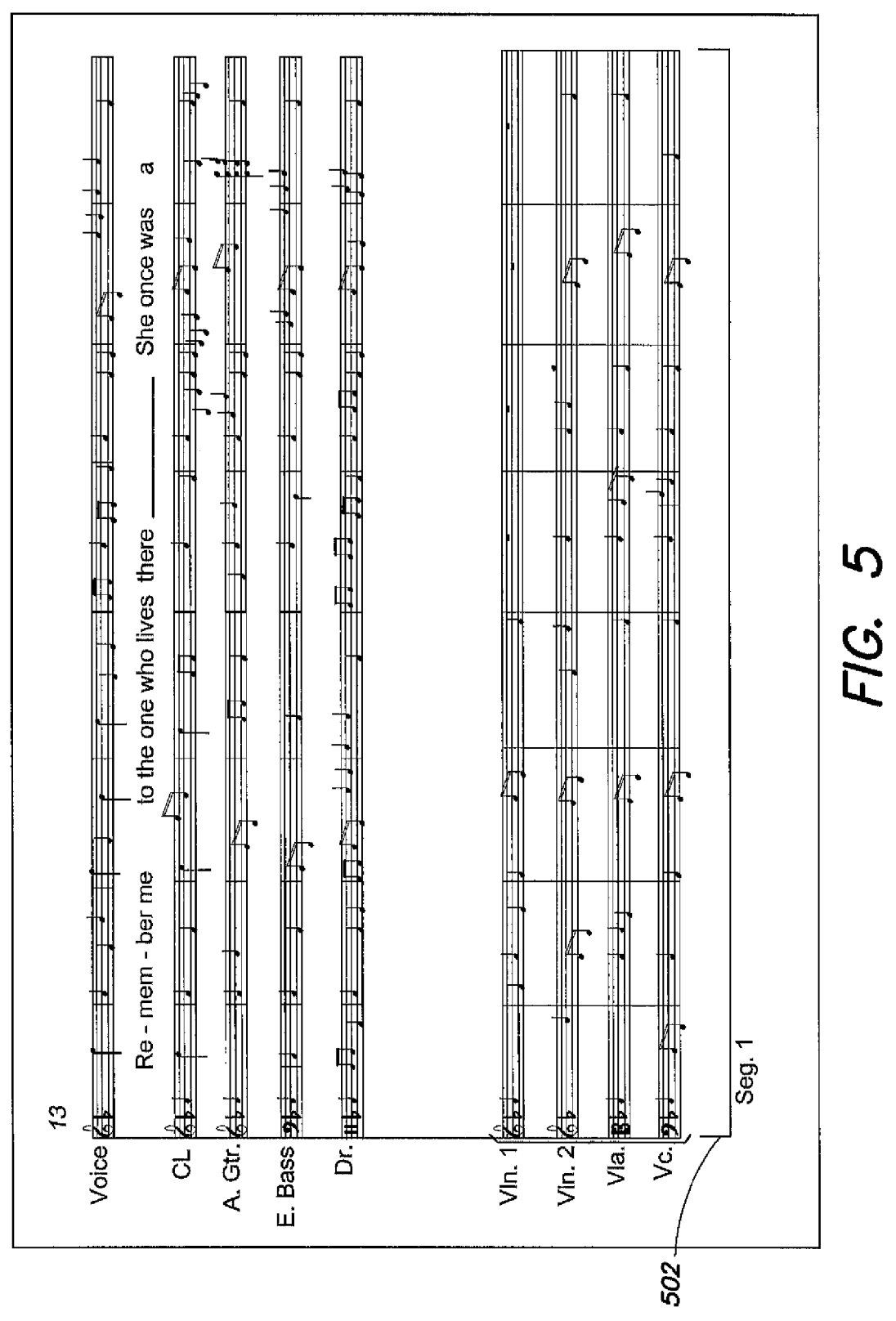

Having determined the playback positions of the score landmark elements, the score is divided into numbered segments which are drawn when requested by a video renderer, and which synchronize with the separately-generated audio. A segment may be defined as a period of the playback between fixed points in time during which the display does not change. There are two principal cases: with and without displayed playback line. If the playback line is to be displayed, segment duration is the playback duration between beat divisions. Notes having values of less than a beat may sound before the playback line moves to the next beat division, as illustrated in FIG. 4. The beat division is generally set by the music notation software, which has a default setting for a given time signature and meter. The user can change the beat division (though preferably not in the video export user interface), for example in a 6/8 time signature changing the beat division from 2 per bar with 3,3 groupings of eighth notes to six per measure. If the playback line is not to be displayed, segment duration is the duration of playback between page changes, including those necessitated by repeat structures in the music. In this case, many notes will usually sound before a new page of musical material needs to be displayed, as illustrated in FIG. 5 which shows segment 502 corresponding to a whole page of the score.

Figure 6:
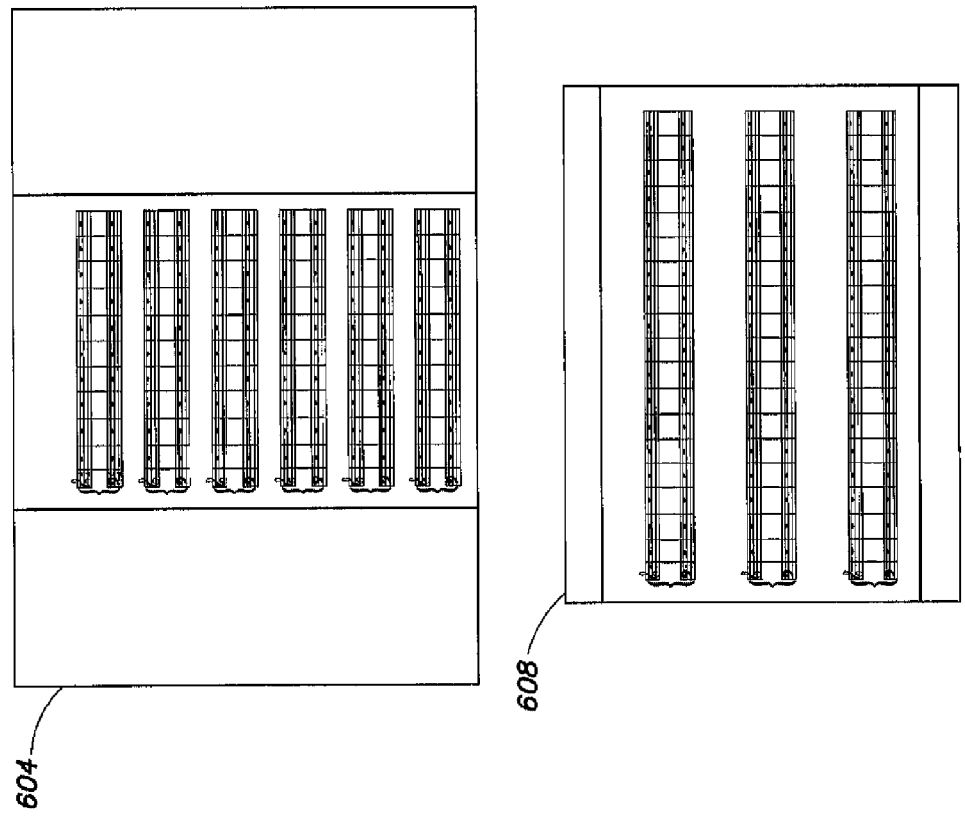
FIG. 6 is an illustration of scaling print format output of a score for a video frame while preserving aspect ratio.
Figure 6:
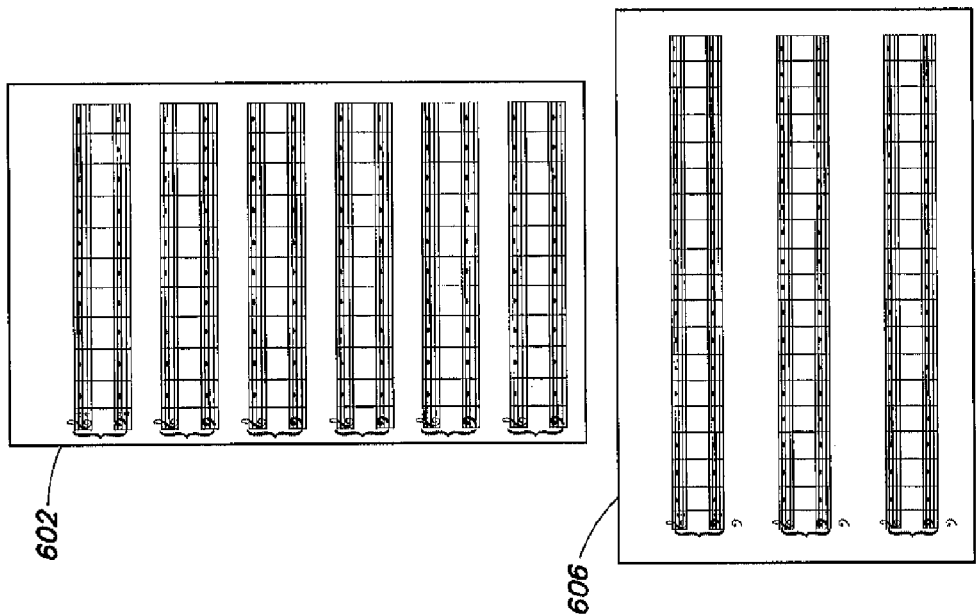
Figure 7:
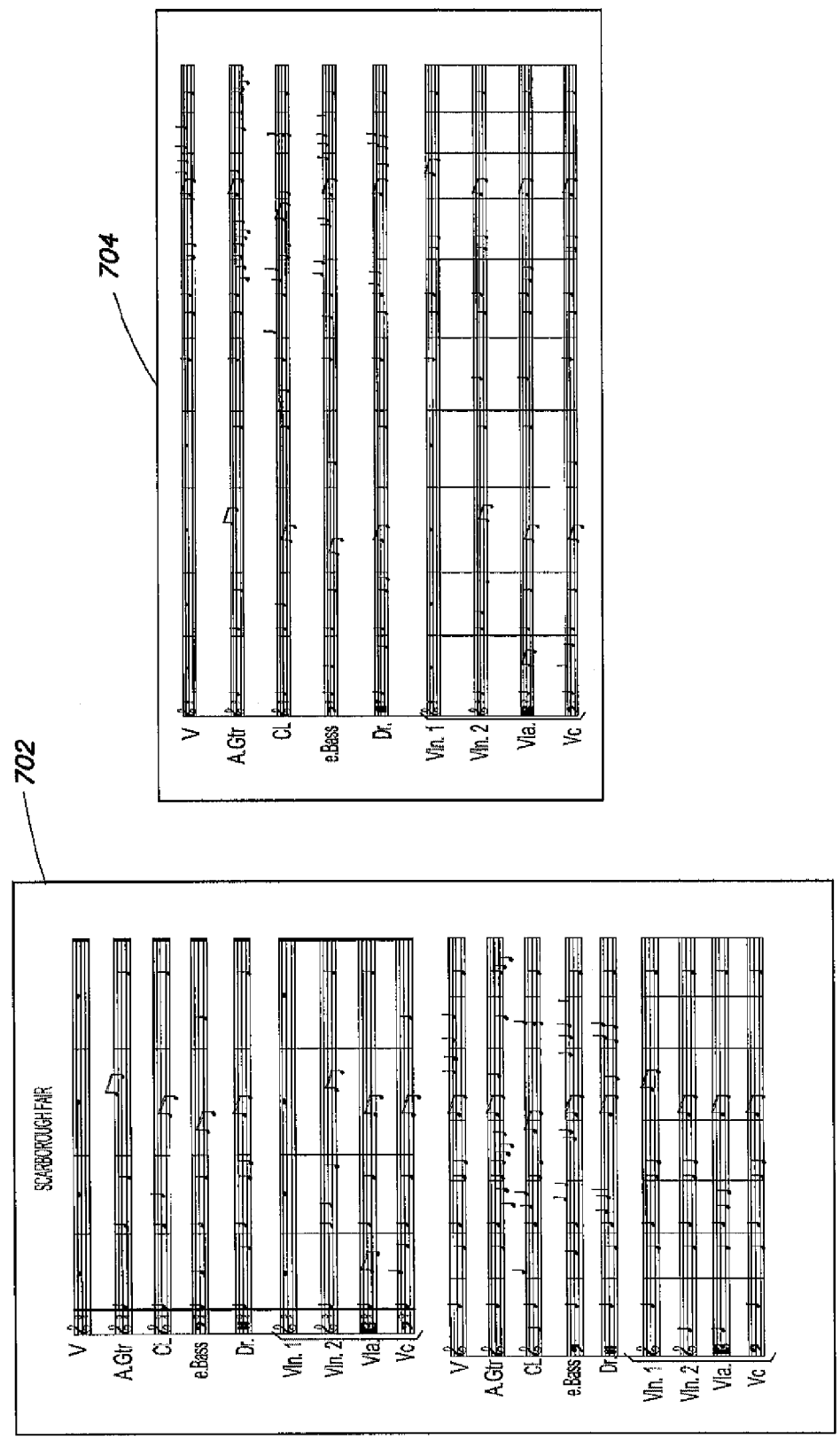
FIG. 7 is an illustration of reformatting a score from print format to a format adapted to video output.

In the described embodiment, each segment is drawn in the following manner. Paper texture is optionally added behind the drawn score if the user selects the score paper texture option. Otherwise, a white background is drawn. The calculated page layout is scaled to fit the video dimensions in pixels by comparing the aspect ratio of the page with the aspect ratio of the chosen video resolution to determine the scale factors that preserve the relative proportions of the calculated page. This ensures that scores that are not optimized (i.e., where print format is selected) are scaled appropriately to fit the video frame. For example, as illustrated in FIG. 6, a typical portrait page layout (602) is scaled to just fit the vertical dimension into the video frame (604), and a typical landscape page layout (606) is scaled to just fit the horizontal dimension into the video frame (608). The scaled page is offset to appear centered in the video display, further optimizing positioning for non-optimized scores. The playback line is then optionally displayed if that feature is selected. If the print format option is not selected and the export page format is optimized, the music is laid out afresh in the new format. FIG. 7 illustrates an example of such an optimization, with the standard print output page format (702) laid out afresh in a format corresponding to a 4:3 video frame (704).

The final step before export is to render the output video. The audio component may be generated by mapping each instrument of the score to a virtual software instrument (e.g. a VST plug-in), and the system maps the notated score into MIDI events that trigger sounds in the virtual software instrument. The system then mixes these together into a stereo audio signal and directs the output to a file.

The temporally sequenced set of segments and the audio file are then synchronized, such that audible events coincide with the necessary display changes in the visible representation of the musical score. The matching is performed by examining the music in the score file, exploiting the fact that the generated audio is based on the same data as the video output.

Figure 8:
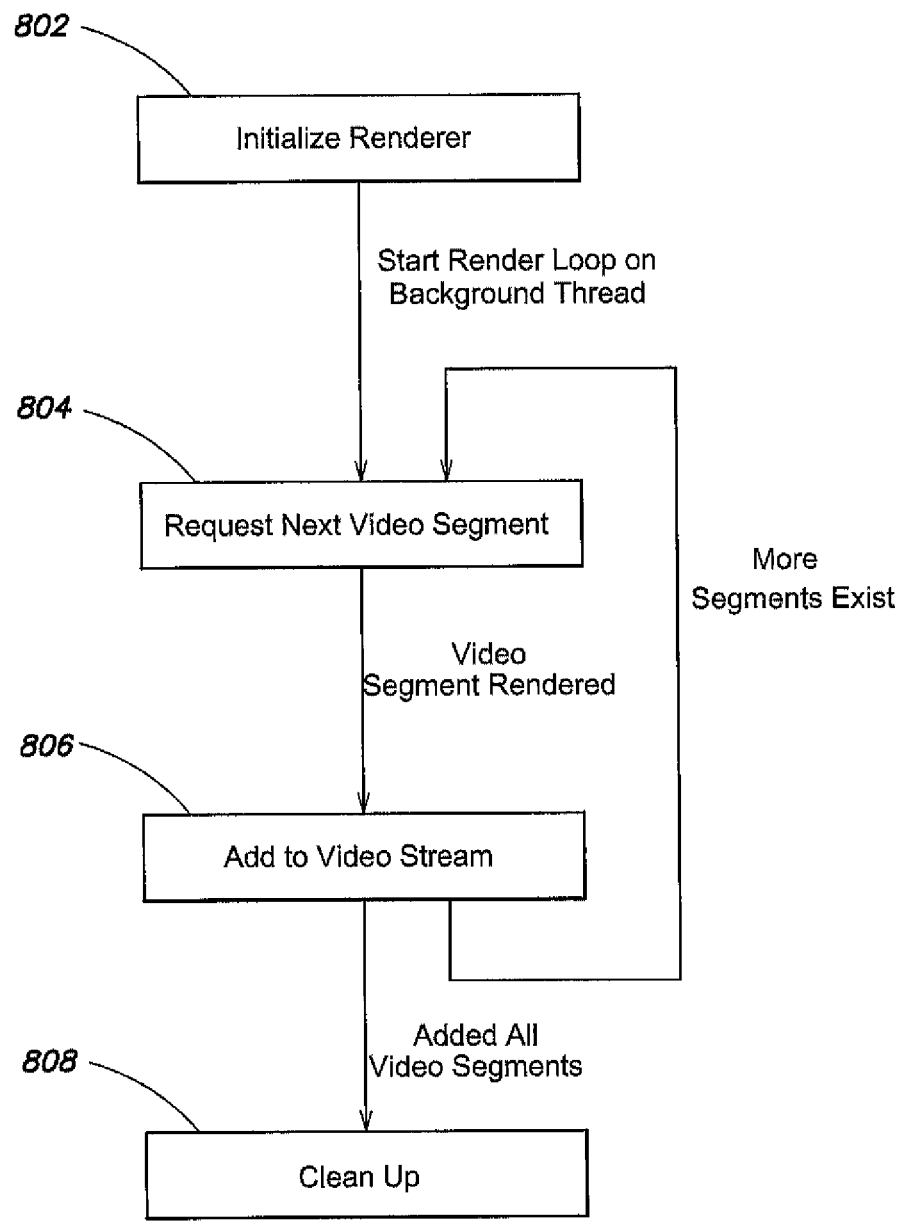
FIG. 8 is a flow diagram for building a video stream for export from calculated individual video segments.

A high level flow diagram illustrating the building of a video stream for export from the calculated segments is shown in FIG. 8. The renderer is initialized (802), and the next video segment is requested (804). The next video segment is rendered, and added to the video stream (806). If more segments exist, the next segment is requested and added to the video stream. When all the segments have been added, the system terminates and cleans up. (808)

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

The system may be implemented as a portable device, such as a touch-sensitive tablet computer or a mobile communication device.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, audio output devices such as loudspeakers or headphones, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of generating a video playback of a digital musical score, the method comprising:
   for each of a series of landmark elements in the digital musical score:
      determining a temporal location of audio playback of that landmark element in an audio playback of the digital musical score;
      generating a video output frame showing a page of the digital musical score rendered in an output page format, wherein the page spans a portion of the digital musical score that includes that landmark element;
      generating a segment of the video playback of the digital musical score, the segment comprising:
         a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and
         an audio component including an audio rendering of a portion of the digital musical score beginning with an audible musical event associated with the first landmark element, and ending with a last musical element prior to an audible musical event associated with the second landmark element; and
   generating the video playback of the digital musical score by using a processor to concatenate the segments.

2. The method of claim 1, wherein the output page format is based in part on an aspect ratio of the video output frame.

3. The method of claim 1, wherein a number of staves on a page in output page format is based in part on an aspect ratio of the video frame.

4. The method of claim 1, wherein the digital musical score includes a plurality of staves, and further comprising:
   receiving input specifying a subset of the plurality of staves to be included in the video playback of the digital musical score.

5. The method of claim 1, further comprising:
   receiving first input data specifying whether the output page format is to correspond to a printed page output format of the digital musical score or whether the output page format is to be adapted to a dimensional characteristic of the video output frame;
   receiving second input data specifying a subset of the plurality of staves to be included in the video playback of the digital musical score; and
   determining the output page format based at least in part on the first input data and the second input data.

6. The method of claim 5, wherein determining the output page format includes determining at least one of the set consisting of a vertical spacing of staves, a vertical positioning of staves, a vertical spacing of systems of music, a vertical positioning of systems of music, and a number of systems of music per page.

7. The method of claim 1, wherein the landmark elements include at least one of page breaks, repeat structures, and beat divisions.

8. The method of claim 1, further comprising:
   receiving data specifying whether a playback line is to be included in the video playback of the digital musical score; and
   if the received data specifies that a playback line is to be included in the video playback of the digital musical score:
      designating beat divisions in the digital musical score as landmark elements; and
      including a rendering of a playback line in the video output frame at a location in the page of the musical score corresponding to beat division immediately prior to a musical element of the digital musical score currently being played back.

9. A computer program product comprising:
   a non-transitory computer-readable medium with computer program instructions encoded thereon, wherein the computer program instructions, when processed by a computer, instruct the computer to perform a method of generating a video playback of a digital musical score, the method comprising:
   for each of a series of landmark elements in the digital musical score:
      determining a temporal location of audio playback of that landmark element in an audio playback of the digital musical score;
      generating a video output frame showing a page of the digital musical score rendered in an output page format, wherein the page spans a portion of the digital musical score that includes that landmark element;

generating a segment of the video playback of the digital musical score, the segment comprising:

a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and an audio component including an audio rendering of a portion of the digital musical score beginning with an audible musical event associated with the first landmark element, and ending with a last musical element prior to an audible musical event associated with the second landmark element; and generating the video playback of the digital musical score by concatenating the segments.

10. The computer program product of claim 9, wherein the output page format is based in part on an aspect ratio of the video output frame.

11. The computer program product of claim 9, wherein a number of staves on a page in output page format is based in part on an aspect ratio of the video frame.

12. The computer program product of claim 9, wherein the digital musical score includes a plurality of staves, and wherein the method further comprising:

receiving input specifying a subset of the plurality of staves to be included in the video playback of the digital musical score.

13. The computer program product of claim 9, wherein the landmark elements include at least one of page breaks, repeat structures, and beat divisions.

14. The computer program product of claim 9, wherein the method further comprises:

receiving data specifying whether a playback line is to be included in the video playback of the digital musical score; and if the received data specifies that a playback line is to be included in the video playback of the digital musical score:

designating beat divisions in the digital musical score as landmark elements; and including a rendering of a playback line in the video output frame at a location in the page of the musical score corresponding to beat division immediately prior to a musical element of the digital musical score currently being played back.

15. A computer system for generating a video playback of a digital musical score, the computer system comprising:

a processor programmed to:

for each of a series of landmark elements in the digital musical score:

determine temporal location of audio playback of that landmark element in an audio playback of the digital musical score;

generate a video output frame showing a page of the digital musical score rendered in an output page format, wherein the page spans a portion of the digital musical score that includes that landmark element;

generate a segment of the video playback of the digital musical score, the segment comprising:

a video component including a still sequence of the video output frame having a duration approximately equal to a difference between a temporal location of audio playback of a second landmark element of the series of landmark elements and the temporal location of the first-mentioned landmark element, wherein the second landmark element immediately succeeds the first-mentioned landmark element in the series of landmark elements; and an audio component including an audio rendering of a portion of the digital musical score beginning with an audible musical event associated with the first landmark element, and ending with a last musical element prior to an audible musical event associated with the second landmark element; and generate the video playback of the digital musical score by concatenating the segments.

16. The computer system of claim 15, wherein the output page format is based in part on an aspect ratio of the video output frame.

17. The computer system of claim 15, wherein a number of staves on a page in output page format is based in part on an aspect ratio of the video frame.

18. The computer system of claim 15, wherein the digital musical score includes a plurality of staves, and wherein the processor is further programmed to receive input specifying a subset of the plurality of staves to be included in the video playback of the digital musical score.

19. The computer system of claim 15, wherein the landmark elements include at least one of page breaks, repeat structures, and beat divisions.

20. The computer system of claim 15, wherein the processor is further programmed to:

receive data specifying whether a playback line is to be included in the video playback of the digital musical score; and if the received data specifies that a playback line is to be included in the video playback of the digital musical score:

designate beat divisions in the digital musical score as landmark elements; and include a rendering of a playback line in the video output frame at a location in the page of the musical score corresponding to beat division immediately prior to a musical element of the digital musical score currently being played back.

* * * * *